United States Patent [19]

Morikawa

[11] Patent Number: 4,957,089

[45] Date of Patent: Sep. 18, 1990

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 383,869

[22] Filed: Jul. 21, 1989

[30] Foreign Application Priority Data

Jul. 29, 1988 [JP] Japan .................... 63-191121

[51] Int. Cl.⁵ .......................... F02D 41/34
[52] U.S. Cl. ................ 123/486; 123/65 BA; 123/73 C; 123/478
[58] Field of Search .......... 123/65 BA, 73 C, 478, 123/494, 486; 73/118.2

[56] References Cited

U.S. PATENT DOCUMENTS 4,823,755 4/1989 Hirose et al. ................ 123/73 CX

FOREIGN PATENT DOCUMENTS 62-113819 5/1987 Japan.

Primary Examiner—Tony M. Argenbright
Attorney, Agent, or Firm—Martin A. Farber

[57] ABSTRACT

A two-cycle engine has a scavenge pump provided in an intake passage, and a fuel injector provided for injecting fuel directly in a cylinder of the engine. A scavenge pressure sensor is provided in the intake passage for detecting a scavenge pressure. A plurality of data relative to quantity of air induced in the cylinder excluding escape air at scavenging the cylinder are stored in a memory. Quantity of air is derived from the memory in accordance with the detected scavenge pressure. Quantity of fuel injected by the fuel injector is calculated based on the derived quantity of air induced in the cylinder.

2 Claims, 4 Drawing Sheets

FUEL INJECTION CONTROL SYSTEM FOR A TWO-CYCLE ENGINE

BACKGROUND OF THE INVENTION

The present invention relates to a system for controlling the injection of fuel for a two-cycle engine with a direct fuel injection system.

There are various methods for supplying fuel to the two-cycle engine. In a method where fuel is mixed with air to make a combustible mixture and the mixture is supplied to a cylinder of the engine, a part of the fuel escapes from the cylinder through an exhaust port at the scavenging of the cylinder. In order to prevent fuel from escaping through the exhaust port, a method in which air alone is delivered to the cylinder and fuel is injected directly to the cylinder by an injector is proposed.

Japanese Patent Application Laid-Open No. 62-113819 discloses a two-cycle engine in which first and second scavenge passages are provided. The first scavenge passage is provided with a first throttle valve and a fuel injector to supply a combustible mixture to a cylinder of the engine. The second scavenge passage is provided for supplying air. The quantity of fuel is calculated in accordance with engine speed and a signal from an air-flow meter. The cylinder is scavenged by air, then supplied with the combustible mixture. In the system, fresh air must be quickly delivered from first and second scavenge passages to perform scavenging. Accordingly, the structure and control system of the engine are complicated. Thus, it is preferable to employ a direct fuel injection system for directly injecting fuel to the cylinder.

In addition, a part of intake air escapes inevitably from the cylinder at scavenging without forming the combustion mixture. Since the quantity of intake air detected by the air-flow meter includes the escaping air, the air-fuel ratio of the mixture cannot be accurately controlled.

Consequently, it is necessary to determine the quantity of fuel based on the quantity of intake air in the cylinder excluding the quantity of air discharged from the cylinder.

In order to obtain the quantity of air excluding the quantity of discharged air based on the quantity of air detected by the air-flow meter, a complicated system having a memory and calculator is necessary.

SUMMARY OF THE INVENTION

The object of the present invention is to provide a fuel injection control system for a two-cycle engine in which the quantity of fuel is controlled with accuracy based on the quantity of intake air in a cylinder of the engine.

According to the present invention, there is provided a system for controlling quantity of fuel for a two-cycle engine having at least one cylinder, a scavenge port, an exhaust port, an intake passage communicated with the scavenge port, a fuel injector provided for injecting the fuel directly in the cylinder, and a scavenge pump provided in the intake passage for supplying air to the cylinder.

The system comprises a pressure sensor provided in the intake passage for detecting the pressure of scavenge air delivered by the scavenge pump and for producing a scavenge pressure signal, an engine speed sensor for detecting engine speed and for producing an engine speed signal, a first memory storing a plurality of data relative to quantity of intake air in the cylinder excluding quantity of escape air at scavenging the cylinder, first means for deriving quantity of intake air from the table in accordance with the scavenge pressure signal and with the engine speed signal, and calculator means for calculating quantity of fuel injected by the fuel injector based on the quantity of intake air induced in the cylinder.

In an aspect of the invention, the system further comprises a second memory storing a plurality of data relative to desired air-fuel ratio, second means for deriving a desired air-fuel ratio from the second memory in accordance with the scavenge pressure signal and with the engine speed signal, said calculator means calculating the quantity of fuel further based on the derived desired air-fuel ratio.

These and other objects and features of this invention will become understood from the following description with reference to the accompanying drawings.

DETAILED DESCRIPTION OF THE PREFERRED EMBODIMENT

Figure 1:
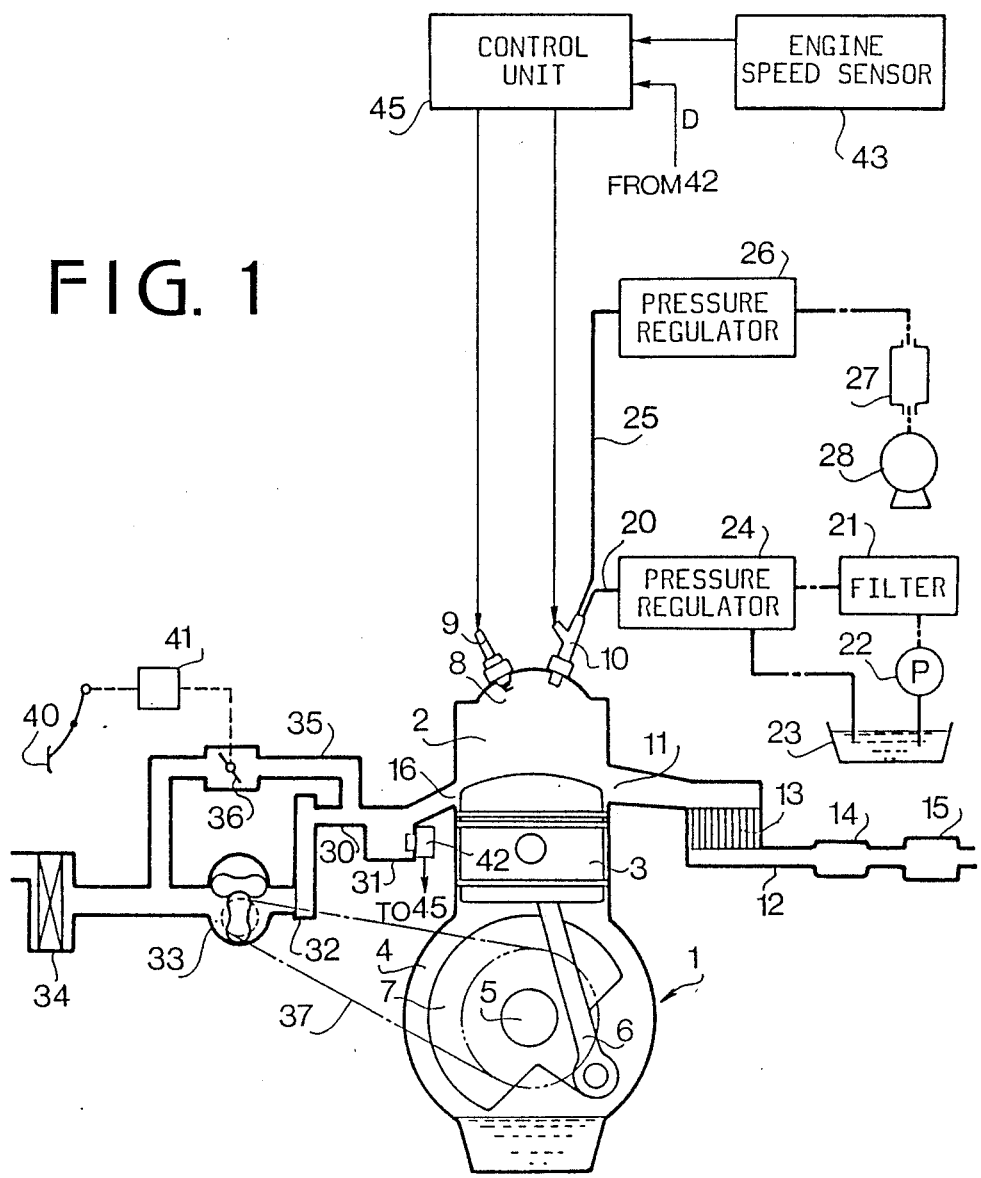
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed in 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with compressed air in the form of air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 through a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air, an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40.

A scavenge pressure sensor 42 is provided in the scavenge chamber 31 for detecting scavenge pressure of scavenge air delivered by the scavenge pump 33 and adjusted by the control valve 36 so as to determine driving conditions. Further, an engine speed sensor 43 is provided for determining engine operating conditions.

Output signals from sensors 42, 43 are supplied to a control unit 45 which feeds an ignition signal, an air injection pulse signal and a fuel injection pulse signal to the spark plug 9 and the injector 10, respectively.

Figure 2:
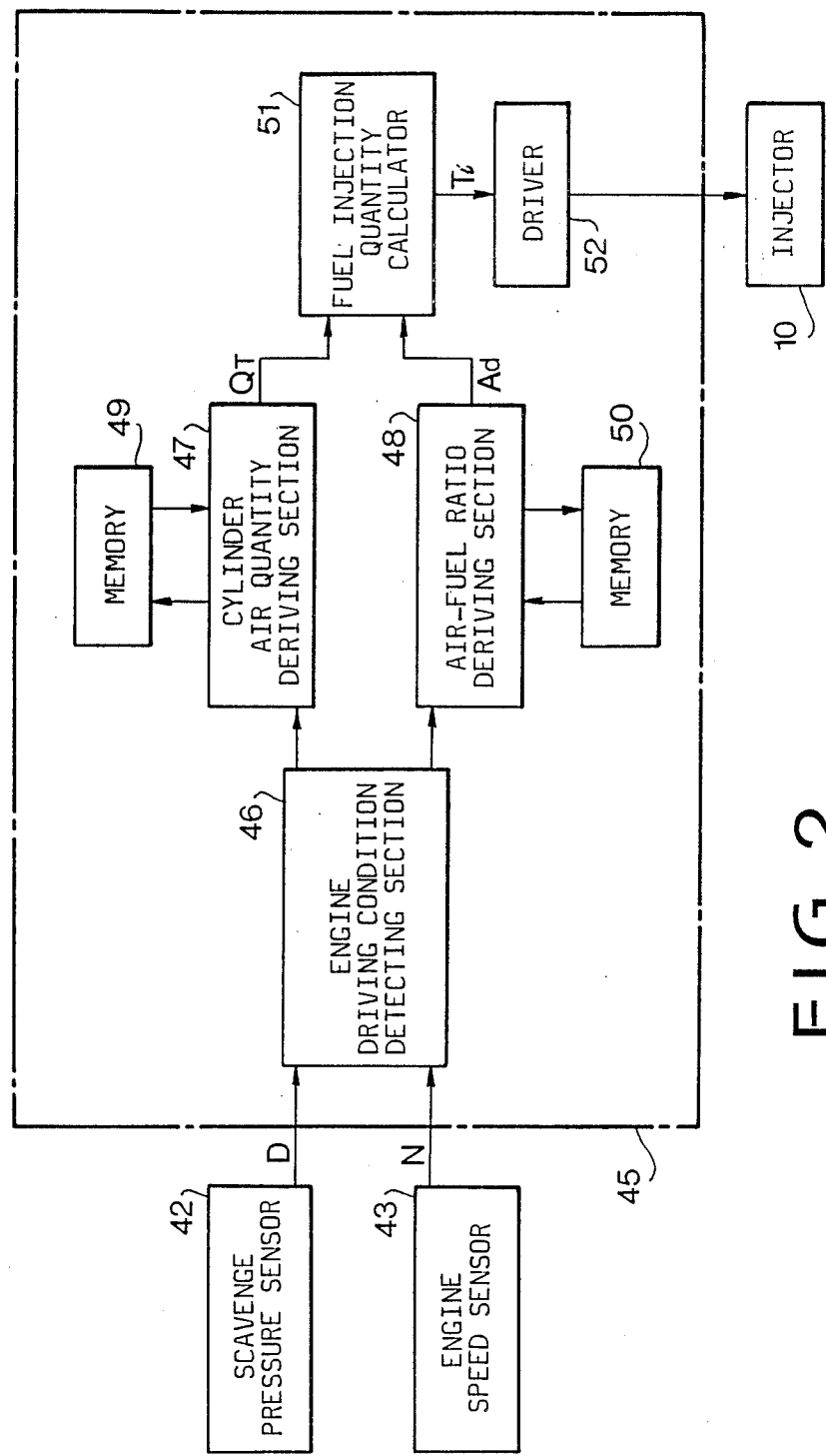
FIG. 2 is a block diagram showing a control unit according to the present invention.
Figure 3A:
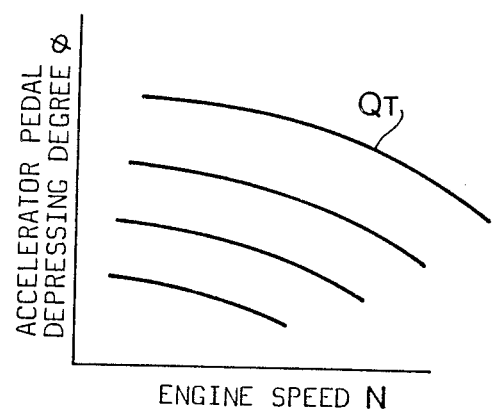
FIG. 3a is a graph showing the quantity of air induced in a cylinder of the engine.

Referring to FIG. 2, the control unit 45 has an engine driving condition detecting section 46 to which scavenge pressure D and engine speed N from the sensors 42 and 43 are applied. The output signal of the engine driving condition detecting section 46 is applied to a cylinder air quantity deriving section 47 and a desired air-fuel ratio deriving section 48. The cylinder air quantity deriving section 48 is provided for deriving a quantity of air QT in the cylinder from a table provided in a memory 49. The memory 49 stores a plurality of data relative to quantity of air QT in the cylinder obtained by experiments in accordance with scavenge pressure D and engine speed N. The quantity of air QT represents the quantity of air actually supplied to the cylinder 2 per cycle of the operation of the engine, which is a value obtained by subtracting the quantity of escape air from the quantity of scavenge air supplied from the scavenge pump 33. As shown in FIG. 3a, the quantity air QT is an increasing function of the scavenge pressure D.

Figure 3B:
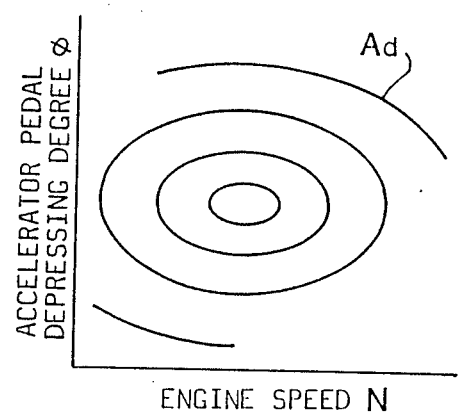
FIG. 3b is a graph showing desired air-fuel ratios.

The desired air-fuel ratio deriving section 48 is provided for deriving a desired air-fuel ratio Ad from a table provided in a memory 50. The memory 50 stores a plurality of data relative to desired air-fuel ratio Ad arranged in accordance with scavenge pressure D and engine speed N as shown in FIG. 3b. The quantity QT of air in the cylinder and the desired air-fuel ratio Ad from sections 47 and 48 are supplied to a fuel injection quantity calculator 51 which calculates a quantity of injected fuel Ti with an equation Ti=f·QT/Ad. A fuel injection signal corresponding to the calculated fuel quantity Ti is applied to a driver 52 which produces a fuel injection pulse signal and an air injection pulse signal for driving the fuel injector 10.

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is largely opened. As a result, a large amount of air is returned to the inlet side of the scavenge pump 33. Thus, a small amount of air, which corresponds to the small accelerator pedal depressing degree, flows into the cylinder 2 for scavenging without causing pumping loss As the depressing degree $\phi$ increases, the quantity of fresh air forced into the cylinder 2 increases with closing of the control valve 36.

When the piston 3 reaches a position close to the bottom dead center as shown in FIG. 1, the scavenge port 16 opens as well as the exhaust port 11 so that intake air, quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 45 is injected by the compressed air, which is supplied in accordance with the air pulse signal, as air-fuel mixture. The mixture is swirling in the combustion chamber with the scavenging air and ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where cylinder 2 is scavenged.

Figure 4:
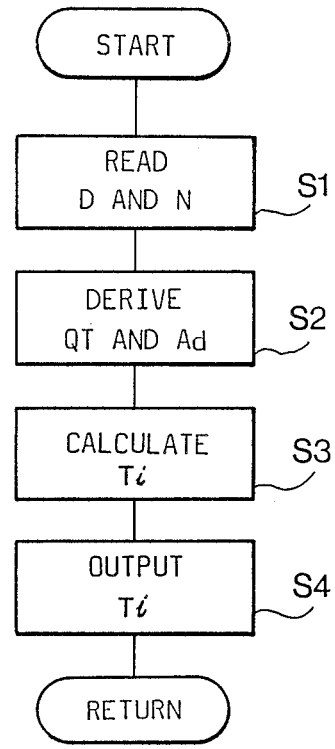
FIG. 4 is a flowchart showing an operation of the system.

Describing the operation of the system with reference to the flowchart of FIG. 4, signals D and N are read from the sensor 42 and 43 and engine driving conditions are detected in the engine driving condition detecting section 46 at a step S1. The scavenge air having a pressure is induced in the cylinder 2 for scavenging the burned gas in the cylinder. At that time, a part of the scavenge air escapes from the cylinder through the exhaust port together with the burned gas. In accordance with scavenge pressure D and engine speed N, the quantity QT of intake air in the cylinder is derived from the table in the memory 49 through the cylinder air quantity deriving section 47, at a step S2. Further, a desired air-fuel ratio Ad is derived from the table in the memory 50 through the air-fuel ratio deriving section 48. At a step S3, a quantity of injected fuel Ti is calculated in the fuel injection quantity calculator 51 based the intake air quantity QT and the desired air-fuel ratio Ad. At a step S4, the quantity of fuel Ti is injected in the cylinder 2 from the injector 10. Thus, the air-fuel ratio of the mixture in the cylinder is controlled to the desired air-fuel ratio.

If a temperature sensor is provided in the scavenge chamber 31 for correcting the air-fuel ratio, the air-fuel ratio is more accurately controlled.

In accordance with the present invention, the quantity of injected fuel is controlled based on the quantity of air induced in the cylinder. Thus, the air-fuel ratio as well as the quantity of injected fuel is controlled with accuracy, thereby improving fuel consumption, exhaust emission and driveability of the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling quantity of fuel for a two-cycle engine having at least one cylinder, a scavenge port, an exhaust port, an intake passage communicated with said scavenge port, a fuel injector provided for injecting the fuel directly in the cylinder, and a scavenge pump provided in said intake passage for supplying air to the cylinder, the system comprising:

a pressure sensor provided in the intake passage for detecting the pressure of scavenge air delivered by the scavenge pump and for producing a scavenge pressure signal;

an engine speed sensor for detecting engine speed and for producing an engine speed signal;

a first memory storing a plurality of data relative to quantity of intake air in the cylinder excluding quantity of escape air at scavenging the cylinder;

first means for deriving quantity of intake air from the table in accordance with the scavenge pressure signal and with the engine speed signal; and calculator means for calculating quantity of fuel injected by the fuel injector based on the quantity of intake air induced in the cylinder.

2. The system according to claim 1 further comprising:

a second memory storing a plurality of data relative to desired air-fuel ratio;

second means for deriving a desired air-fuel ratio from the second memory in accordance with the scavenge pressure signal and with the engine speed signal, said calculator means calculating the quantity of fuel further based on the derived desired air-fuel ratio.

* * * * *